US008893475B2

(12) United States Patent
Geveci et al.

(10) Patent No.: US 8,893,475 B2
(45) Date of Patent: Nov. 25, 2014

(54) CONTROL SYSTEM FOR DOSER COMPENSATION IN AN SCR SYSTEM

(75) Inventors: Mert Geveci, Bloomington, IN (US); Aleksey Yezerets, Columbus, IN (US); Neal W. Currier, Columbus, IN (US); Michael Haas, Columbus, IN (US); Andrew W. Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 699 days.

(21) Appl. No.: 13/045,231

(22) Filed: Mar. 10, 2011

(65) Prior Publication Data

US 2011/0219747 A1   Sep. 15, 2011

Related U.S. Application Data

(60) Provisional application No. 61/312,904, filed on Mar. 11, 2010.

(51) Int. Cl.
*F01N 3/00*     (2006.01)
*F01N 3/20*     (2006.01)

(52) U.S. Cl.
CPC ............. *F01N 3/208* (2013.01); *F01N 2550/05* (2013.01); *F01N 2560/021* (2013.01); *F01N 2610/02* (2013.01); *F01N 2900/1602* (2013.01); *F01N 2900/1621* (2013.01); *Y02T 10/24* (2013.01)
USPC ................ 60/286; 60/274; 60/295; 60/301

(58) Field of Classification Search
CPC ............... F01N 3/208; F01N 2550/05; F01N 2560/021; F01N 2610/02; F01N 2900/1602; F01N 2900/1621; Y02T 10/24
USPC ................... 60/274, 286, 295, 301
See application file for complete search history.

(56) References Cited

U.S. PATENT DOCUMENTS

| 6,082,102 | A  | 7/2000 | Wissler et al. |
| 6,209,315 | B1 | 4/2001 | Weigl |
| 6,415,602 | B1 | 7/2002 | Patchett et al. |
| 6,442,932 | B1 | 9/2002 | Hofmann et al. |
| 6,546,720 | B2 | 4/2003 | van Nieuwstadt |
| 6,581,374 | B2 | 6/2003 | Patchett et al. |

(Continued)

FOREIGN PATENT DOCUMENTS

| DE | 19818448   | 10/1999 |
| JP | 2003314256 | 4/2002  |

OTHER PUBLICATIONS

International Search Report and Written Opinion, PCT/US2011/028181, Cummins Inc., ISR/US, Apr. 26, 2011.

(Continued)

*Primary Examiner* — Jesse Bogue
*Assistant Examiner* — Matthew T Largi
(74) *Attorney, Agent, or Firm* — Krieg DeVault LLP

(57) ABSTRACT

A method includes determining whether selective catalytic reduction (SCR) test conditions are present, and in response to the SCR test conditions being present, operating an SCR aftertreatment system at a number of reduced ammonia to NOx ratio (ANR) operating points. The method further includes determining a $deNO_x$ efficiency value corresponding to each of the ANR operating points. The method further includes determining a reductant correction value in response to the $deNO_x$ efficiency values corresponding to each of the ANR operating points, and providing a reductant injection command in response to the reductant correction value.

23 Claims, 5 Drawing Sheets

(56) References Cited

U.S. PATENT DOCUMENTS

| | | | |
|---|---|---|---|
| 6,662,553 B2 * | 12/2003 | Patchett et al. | 60/286 |
| 7,143,578 B2 | 12/2006 | Kakwani et al. | |
| 7,150,145 B2 | 12/2006 | Patchett et al. | |
| 7,452,724 B2 | 11/2008 | Wickert | |
| 7,765,795 B2 * | 8/2010 | Driscoll et al. | 60/285 |
| 8,112,986 B2 * | 2/2012 | Kurtz | 60/285 |
| 8,281,578 B2 * | 10/2012 | Upadhyay et al. | 60/301 |
| 2005/0282285 A1 * | 12/2005 | Radhamohan et al. | 436/55 |
| 2005/0287034 A1 | 12/2005 | Wills et al. | |
| 2008/0016856 A1 * | 1/2008 | Zhang et al. | 60/297 |
| 2010/0024390 A1 * | 2/2010 | Wills et al. | 60/274 |

OTHER PUBLICATIONS

German Office Action, Apr. 14, 2014, pp. 1-5, German Patent Application No. 112011100874.0 German.

* cited by examiner

US 8,893,475 B2

CONTROL SYSTEM FOR DOSER COMPENSATION IN AN SCR SYSTEM

RELATED APPLICATIONS

This application is related, and claims the benefit of, U.S. Provisional Application No. 61/312,904 filed on Mar. 11, 2010 which is incorporated herein by reference for all purposes.

BACKGROUND

The technical field generally relates to internal combustion engine technology. More particularly but not exclusively, the present application relates to an exhaust gas aftertreatment process and device for an internal combustion engine equipped with a selective catalytic reduction (SCR) catalyst. Current SCR catalyst and doser configurations have various drawbacks. Variability in current dosing systems can adversely affect SCR catalyst performance. Dosing more reductant than the desired amount, or the amount that can be consumed in the reaction inside the SCR catalyst, wastes reductant and may cause ammonia slip. Dosing less reductant than the desired amount results in lower $NO_x$ reduction and an increase in $NO_x$ emissions. Presently available injectors are not readily diagnosed to determine if an off-nominal amount of reductant is being injected. Therefore, further technological developments are desirable in this area.

SUMMARY

One embodiment of the present application is a unique procedure to diagnose performance of a doser for an exhaust system equipped with an SCR catalyst. Other embodiments include unique methods, systems, and apparatus to diagnose doser performance and to adjust doser injection. Further embodiments, forms, objects, features, advantages, aspects, and benefits shall become apparent from the following description and drawings.

DESCRIPTION OF THE ILLUSTRATIVE EMBODIMENTS

Figure 1:
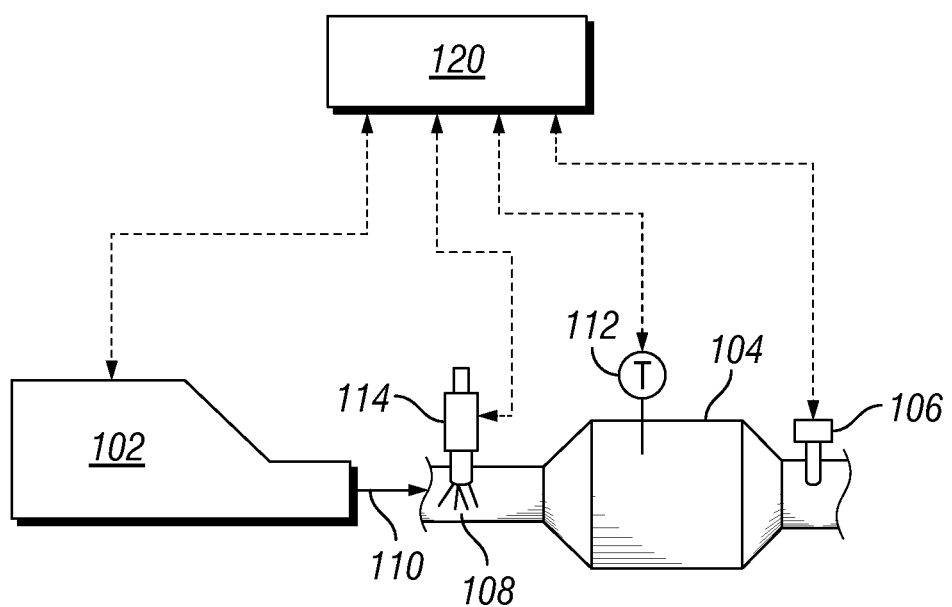
FIG. 1 is a schematic illustration of a system for diagnosing doser performance.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic illustration of one embodiment of a system for diagnosing doser performance. An internal combustion engine 102 produces an exhaust stream 110. The internal combustion engine 102 may be a diesel engine, gasoline engine, or any other internal combustion engine known in the art. The exhaust stream 110 passes through an exhaust pipe 108 into a selective catalytic reduction (SCR) catalyst 104. The doser 114 injects a reductant into exhaust stream 110 at a location upstream of the SCR catalyst 104. The reductant may be aqueous urea; however, it is contemplated that other liquid or gaseous reductants including ammonia, hydrocarbons, or other reductants known in the art can be utilized. Control unit 120 commands the amount of urea injected by doser 114.

The urea injected by doser 114 produces ammonia which reacts with $NO_x$ inside the SCR catalyst 104 and can reduce the amount of $NO_x$ emitted into the atmosphere. In certain embodiments, the ammonia to NO ratio (ANR) during engine operation is determined and the doser 114 command is adjusted to achieve a target ANR. The system includes a temperature sensor 112 and $NO_x$ sensor 106 in communication with a control unit 120.

The sensors 112, 106 may communicate with the control unit 120 directly or the sensors 112, 106 may communicate with the control unit 120 through a datalink, network, and/or by providing parameters to an engine control module (ECM) which may be a part of the control unit 120 or may be a separate controller. The temperature sensor 112 determines a temperature of the SCR catalyst 104. The temperature sensor 112 is illustrated within the SCR catalyst 104 as shown, but may be positioned upstream and/or downstream of the SCR catalyst. The temperature of the SCR catalyst 104 may be determined by any method understood in the art, including at least utilizing a weighted average of upstream and downstream temperature sensors (not shown), or modeling and/or estimating the temperature of the SCR catalyst 104 based upon other temperature measurements available in the system. In certain embodiments, the system does not include a temperature determination or estimate of the SCR catalyst 104.

The system includes a $NO_x$ sensor 106 positioned downstream of the SCR catalyst 104. The $NO_x$ sensor 106 measures the NO at a position downstream of the SCR catalyst 104. The NOx sensor 106 communicates directly with the control unit 120, and/or provides the $NO_x$ value to the control unit 120 via a datalink, network, or other communication.

In certain embodiments, the control unit 120 includes a controller 120 that performs certain operations to determine the operational performance of a doser. The exemplary controller 120 forms a portion of a processing subsystem including one or more computing devices having memory, processing, and communication hardware. The controller 120 may be a single device or a distributed device, and the functions of the controller may be performed by hardware or software.

In certain embodiments, the controller 120 includes one or more modules structured to functionally execute the operations of the controller. The exemplary controller 120 includes an SCR test condition validation module 202, an injection control module 204, an injector diagnostic module 206, and/or an injector correction module 208. The description herein including modules emphasizes the structural independence of the aspects of the controller 120, and illustrates one grouping of operations and responsibilities of the controller 120. Other groupings that execute similar overall operations are understood to be within the scope of the present application. Modules may be implemented in hardware and/or software on computer readable medium, and modules may be distributed across various hardware or software components. More specific descriptions of certain embodiments of controller operations are included in the section referencing FIG. 2.

Figure 2:
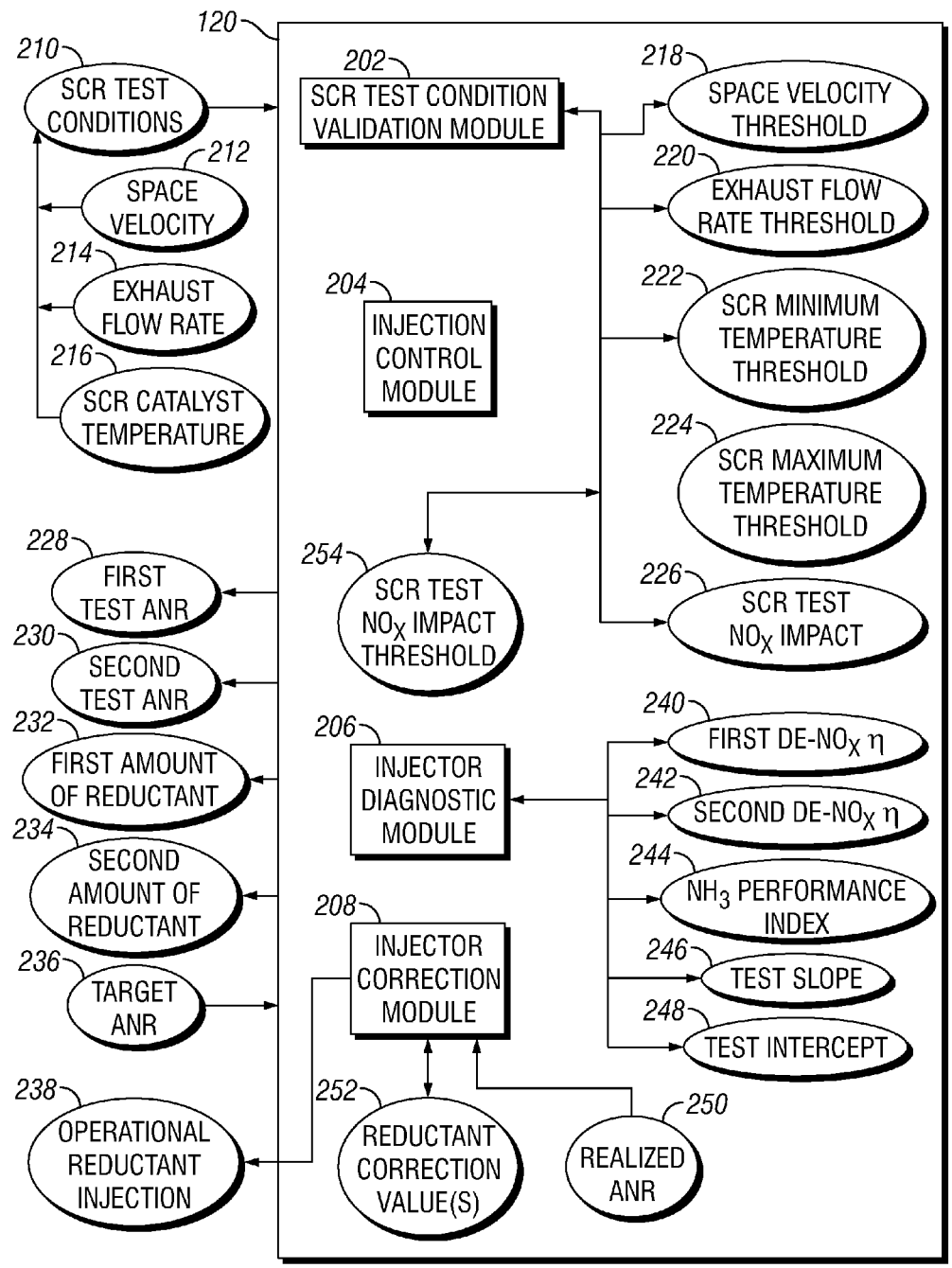
FIG. 2 is a schematic illustration of a control unit for diagnosing doser performance.

FIG. 2 is a schematic diagram of a controller 120 for diagnosing the performance of a doser. The controller 120 includes modules that execute certain operations for diagnosing the performance of a doser. The controller 120 is shown as a single device to simplify description. However, the controller 120 may include multiple devices, distributed devices, some devices that are hardware and/or include a software component. Further, any data values illustrated may be stored on the controller 120 and/or communicated to the controller 120. The controller 120 may include devices that are physically remote from other components of the system but that are at least intermittently in communication with the system via network, datalink, internet, or other communication means.

The controller 120 includes an SCR test condition validation module 202 that determines whether SCR test conditions 210 are met. The determination that the SCR test conditions 210 are met may be performed by any one or more of the following exemplary operations. An exemplary operation includes the SCR test condition validation module 202 determining that a space velocity 212 is less than a space velocity threshold 218. In one example, if the space velocity 212 is too high, significant ammonia slip (due to insufficient time for all ammonia to adsorb onto the SCR catalyst) interferes with detected $NO_x$ on the $NO_x$ sensor and the test results will not be acceptable. Another exemplary operation includes the SCR test condition validation module 202 determining that an exhaust flow rate 214 is below an exhaust flow rate threshold 220.

Another exemplary operation includes the SCR test condition validation module 202 determining that an SCR catalyst temperature 216 is above an SCR minimum temperature threshold 222 and/or below an SCR maximum temperature threshold 224. At low temperatures, urea hydrolysis may proceed too slowly for the test result to be reliable. Also, at low temperatures, ammonia storage on the SCR catalyst is significant, and the storage of ammonia onto the SCR catalyst during the test will make determinations based on the observed $NO_x$ conversion difficult. Therefore, the SCR minimum temperature threshold 222 may be set to a value high enough that ammonia storage is negligible (e.g. greater than 350° C.), or set to a lower value where the SCR test conditions 210 further include sufficient time at the lower temperature value such that the SCR catalyst is saturated with ammonia before the test is initiated. At high temperatures, significant oxidation of ammonia can cause the test result to be unreliable. The temperatures that begin significant oxidation of ammonia depend upon the desired test accuracy, the catalyst formulation, the first and second test ANR 230 values (with lower ANR values experiencing greater error from ammonia oxidation), and the amount of oxygen available in the exhaust gases. In most situations, an SCR maximum temperature threshold 224 of 500° C., 550° C., or even 600° C. will provide acceptable test results.

Yet another exemplary operation includes the SCR test condition validation module 202 determining that a current SCR test $NO_x$ impact 226 is less than an SCR test $NO_x$ impact threshold 254. The current SCR test $NO_x$ impact 226 is the estimated amount of $NO_x$ that would be released over the course of the SCR diagnostic test if the test is initiated under present operating conditions. For example, the current engine $NO_x$ output, the first test ANR 228, the second test ANR 230, and the time spent at each of the test ANR 228, 230 values are utilized to determine a current SCR test $NO_x$ impact 226 which is then compared to the SCR test $NO_x$ impact threshold 254. The SCR test $NO_x$ impact threshold 254 is a predetermined value that may be determined according to the acceptable emissions impact of the test or according to other standards known to those of skill in the art. The SCR test condition validation module 202 may further determine whether the SCR test conditions 210 are met in response to an amount of time since a last test was performed, an operator request to perform a test, whether a test has been performed on a current vehicle trip, whether an engine speed and load are in a transient or steady condition, or other considerations understood in the art.

Referencing FIG. 5, the data points at 501, 502, 503, and 504 are exemplary positions where the SCR temperature and engine $NO_x$ output are acceptable, and where the engine speed and load are steady enough that a test is likely to succeed. The engine $NO_x$ output should be high enough that the $NO_x$ sensor will exhibit a reasonable output response (i.e. with an acceptable signal-to-noise ratio), and low enough that the emissions impact of performing the test will not be too severe.

One exemplary doser compensation strategy utilizes periodic tests, during which doser injection is modified to produce a differential response of $deNO_x$ efficiency to various ANR values. As the ANR approaches 0, the signal-to-noise ratio becomes high and non-conducive to accurate NOx readings. As the ANR approaches 1, ammonia slip may occur and can produce inaccurate NOx sensor readings, and further the $deNO_x$ reaction becomes $NO_x$ or catalyst-site limited and therefore the $deNO_x$ efficiency response to ANR is not a reliable determination of the doser response.

Figure 4:
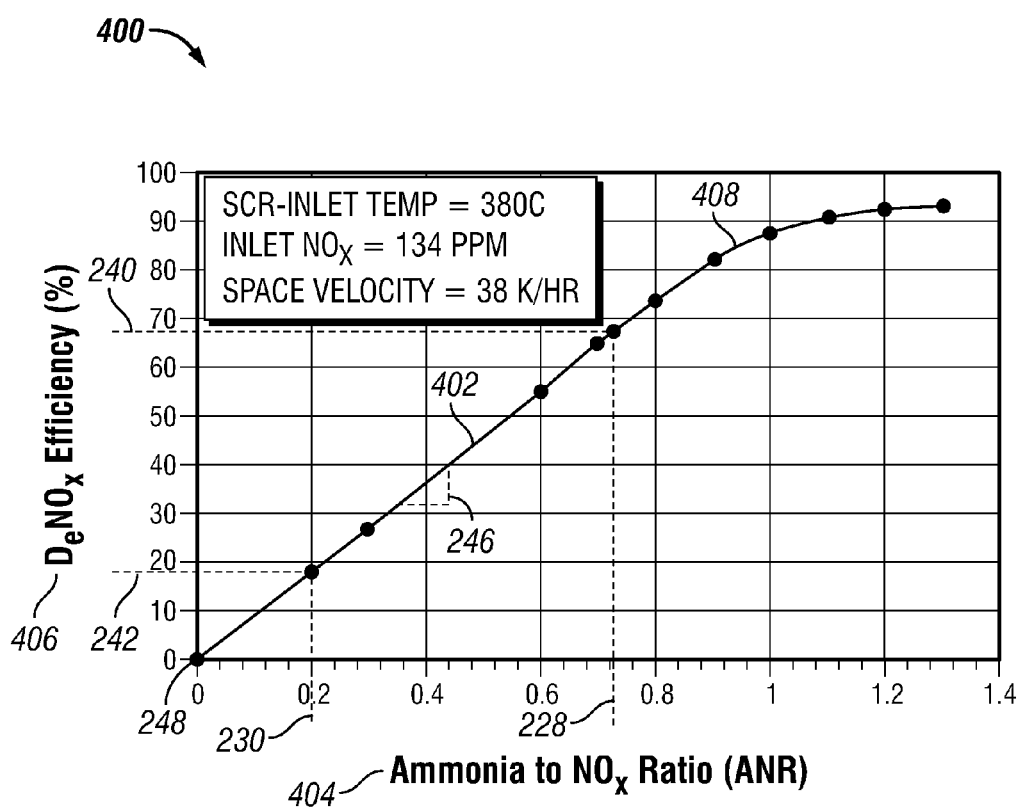
FIG. 4 is a graphical representation of illustrative data of a $NO_x$ conversion efficiency vs. an ammonia to $NO_x$ ratio.
Figure 5A:
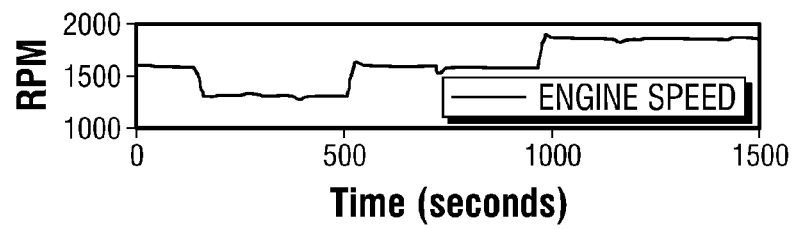
FIG. 5 is a graphical representation of exemplary data illustrating certain engine operating conditions vs. time.
Figure 5B:
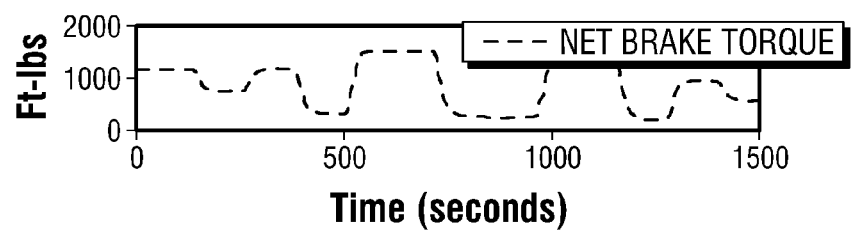
Figure 5C:
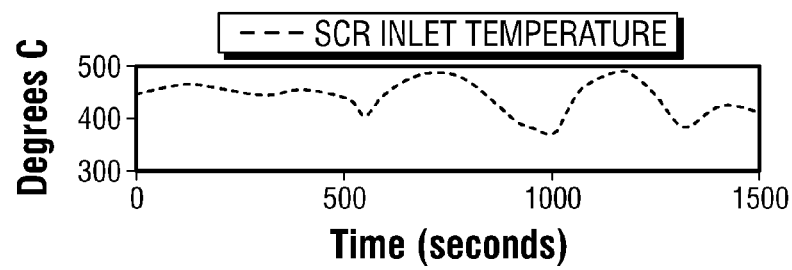
Figure 5D:
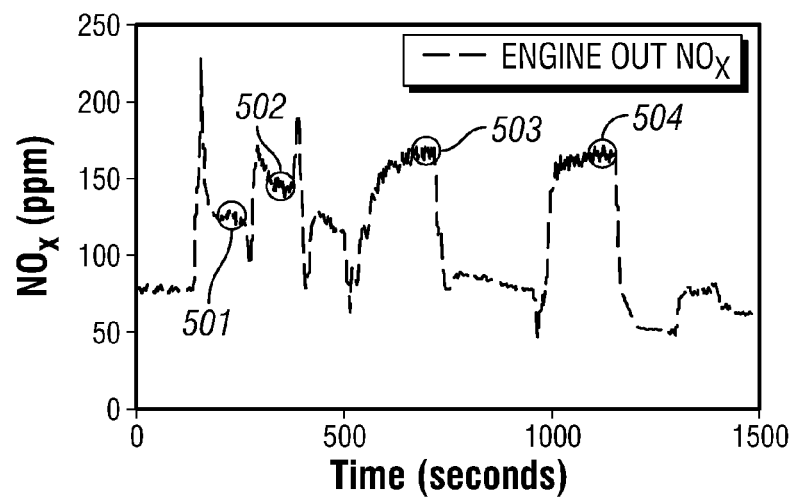

Referencing FIG. 4, illustrative data 400 shows an ANR curve 402, where the curve 402 is a deNOx efficiency 406 as a function of an ANR 404. The data 400 illustrates that as the ANR 404 approaches 1—somewhere in the region 408 in FIG. 4—the $deNO_x$ efficiency response is non-linear. It is desirable to utilize test ANR points that are far enough apart to produce a reliable resulting slope 246 and intercept 248, while avoiding very low ANR values and very high ANR values.

In certain embodiments, the test ANR values include a first test ANR 228 of 0.2 and a second test ANR 230 of 0.7. In other embodiments, the test ANR values include a first test ANR 228 of 0.2 and a second test ANR 230 of 0.9. According to the illustrative data 400, the first $deNO_x$ efficiency 240 corresponds to the first test ANR 228, and the second $deNO_x$ efficiency 242 corresponds to the second test ANR 230, allowing the calculation of a slope 246 and intercept 248. In certain embodiments, a lower test ANR value than 0.2 is possible, and/or a higher test ANR value than 0.9 is possible. The data from FIG. 4 was taken, as shown, at an SCR catalyst inlet temperature of 380° C., an inlet $NO_x$ of 134 ppm, and a space velocity of 38 K/hr. The SCR catalyst inlet temperature is utilized in FIG. 4, but the SCR catalyst outlet temperature, SCR catalyst bed temperature, a modeled temperature, or some weighted value of available temperatures may additionally or alternatively be utilized.

During the testing periods, where the ANR is reduced, the $NO_x$ emissions increase and it is desirable to conduct tests over a minimal amount of time. When the effects of ammonia storage are minimized, a given ANR point can be tested within a few seconds. The test includes a first test ANR 228 and a second test ANR 230, but may further include additional ANR test points, including a buffer of previous ANR test points from previous executions of the test.

The controller 120 further includes an injection control module 204 that performs doser operations during the test. The injection control module 204 injects a first amount of reductant 232 in response to the first test ANR 228, and injects a second amount of reductant 234 in response to the second test ANR 230. The injection control module 204 further responds to any additional test ANR values with appropriate amounts of reductant. The injection control module 204 determines the amount of reductant 232, 234 in response to a present amount of $NO_x$ from the engine, the test ANR value 230, 232, and further in response to any conditions that may be causing a temporary delay or suspended operation of the test.

The controller 120 further includes an injector diagnostic module 206 that determines a first $deNO_x$ efficiency 240 in response to the injecting to achieve the first test ANR 228, and a second $deNO_x$ efficiency 242 in response to the injecting to achieve the second test ANR 230. The injector diagnostic module 206 further determines any additional $deNO_x$ efficiency values for any additional test ANR values. The $deNO_x$ efficiency values 240, 242 are determined according to an SCR inlet $NO_x$ amount and the SCR outlet $NO_x$ amount. The SCR inlet amount may be determined from a sensor (not shown) and/or from a $NO_x$ model or estimate of the engine-out $NO_x$ amount. In certain embodiments, the SCR test conditions 210 may include conditions where an engine-out $NO_x$ model is known to be relatively accurate.

In certain embodiments, the injector diagnostic module 206 further determines a test slope 246 and/or a test intercept 248 in response to the first $deNO_x$ efficiency 240 and the second $deNO_x$ efficiency 242. The test slope 246 is utilized to determine a realized ANR 250 of the injector (doser) in response to the target ANR 236. For example, a test slope 246 of 100 (e.g. 50% efficiency change with 0.5 ANR change) indicates that the injector is providing the commanded amount of reductant. A test slope 246 of 80 (e.g. 40% efficiency change with 0.5 ANR change) indicates that the injector is providing only 80% of the commanded amount of reductant. In certain embodiments, the injector response is determined to be non-linear, and a polynomial fit, lookup table fit (e.g. realized ANR 250 versus target ANR 236 or commanded ANR at several points which can be matched or interpolated), or other type of fit understood in the art is utilized. The determination of $deNO_x$ efficiency may be from a measured $NO_x$ value downstream of the SCR catalyst and a measured or modeled $NO_x$ value upstream of the SCR catalyst.

In certain embodiments, the injector diagnostic module determines the validity of the SCR test and/or the reductant correction value in response to the test intercept 248. Where the test intercept 248 deviates significantly from zero, the injector diagnostic module determines the test is not valid, and the test is not utilized, utilized only partially, and/or performed again. In certain embodiments, where the ANR curve 402 in non-linear, or portions of the ANR curve 402 are non-linear, the test intercept 248 may not be utilized to determine the validity of the test. Alternatively or additionally, only a test intercept 248 corresponding to a linear portion of the ANR curve 402 may be utilized to determine the validity of the test.

In certain embodiments, the injector diagnostic module 206 further determines statistical data about the $deNO_x$ efficiency values, including, without limitation, linearity (e.g. from an $r^2$ value) and repeatability from prior tests. The injector diagnostic module 206 may further determine the reliability of the test slope 246 using the test intercept 248, where test intercept values 248 close to zero indicate a more reliable test slope 246 and test intercept values 248 away from zero indicate a less reliable test slope 246.

In certain embodiments, the injector diagnostic module 206 determines an $NH_3$ performance index 244 in response to the first $deNO_x$ efficiency 240 and the second $deNO_x$ efficiency 242. The $NH_3$ performance index 244 includes a description of the injector realized ANR 250 as a function of the injector target ANR 236. The $NH_3$ performance index 244 may be a ratio, function, lookup-table, indexing parameter that is cross-referenced with a predetermined injector adjustment table, or any other parameter understood in the art.

The controller 120 further includes an injector correction module 208 that adjusts an operational reductant injection 238 in response to achieve a target ANR 236. In certain embodiments, the injector correction module 208 adjusts the operational reductant injection 238 in response to at least one of the test slope 246 and the test intercept 248. In certain embodiments, the injector correction module 208 adjusts the operational reductant injection 238 in response to the $NH_3$ performance index 244. In certain embodiments, the injector correction module 208 determines a reductant correction value 252 (or values) and adjusts the operational reductant injection 238 with the reductant correction value 252. For example, the test slope 246 may indicate that the injector delivers only 80% of the commanded reductant, and the reductant correction value 252 may be a multiplier that is applied either to the nominal reductant injection command or the target ANR 236. In the example, if the reductant correction value 252 is a "1.25" multiplier, the target ANR 236 is 0.96, and the nominal reductant injection command (the injector command that would achieve the 0.96 ANR for a properly functioning injector) is 60 units of reductant, the injector correction module 208 adjusts the target ANR 236 to a value of 1.2, adjusts the nominal reductant injection command to 75 units, or provides an equivalent combination of adjustments such that the realized ANR 250 achieves the target ANR 236 (before adjustments). The operational reductant injection 238 is the reductant injection amount during nominal operation of the system, or during operations of the system that do not include the SCR test.

The schematic flow diagram and related description which follows provides an illustrative embodiment of performing procedures for diagnosing the performance of a reductant doser and compensating for an off-nominal doser. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 3:
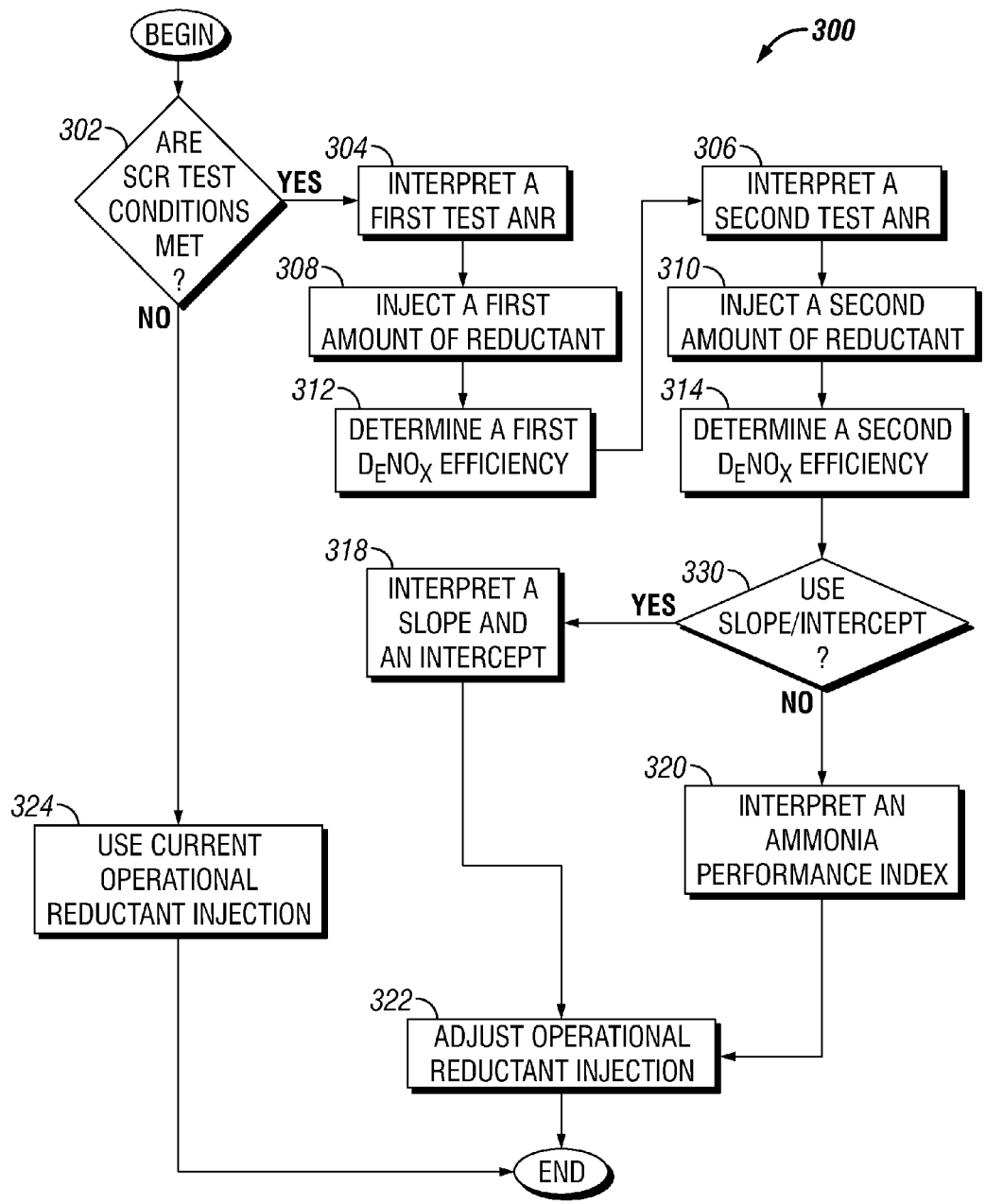
FIG. 3 is a schematic flow diagram of a procedure to adjust operational reductant injection.

FIG. 3 is a schematic flow diagram illustrating a procedure 300 for adjusting reductant injection to meet a target ANR. Procedure 300 includes an operation 302 to determine whether the SCR test conditions are met. If operation 302 determines that the SCR test conditions are not met, the procedure 300 includes operation 324 to use a current operational reductant injection. The current operational reductant injection is the reductant injection scheme either uncorrected, or as adjusted by a reductant correction value determined in a preceding SCR test.

Where the operation 302 determines the SCR test conditions are met, the procedure 300 includes an operation 304 to interpret a first test ANR, an operation 308 to inject a first amount of reductant in response to the first test ANR, and an operation 312 to determine a first $deNO_x$ efficiency in response to the injecting. The procedure 300 further includes an operation 306 to interpret a second test ANR, an operation 310 to inject a second amount of reductant, and an operation 314 to determine a second deNO$_x$ efficiency in response to the injecting.

The procedure 300 further includes an operation 330 to determine whether a slope/intercept adjustment or NH$_3$ performance index adjustment is to be utilized. Where the operation 330 determines a slope/intercept adjustment, the procedure 300 further includes an operation 318 to interpret a test slope and/or test intercept from the first and second deNO$_x$ efficiency values, and an operation 322 to adjust the operational reductant injection in response to the test slope and/or test intercept. Where the operation 330 determines an NH$_3$ performance index, the procedure 300 further includes an operation 320 to interpret the NH$_3$ performance index and the operation 322 to adjust the operational reductant injection in response to the NH$_3$ performance index.

The NH$_3$ performance index can compare the actual amount of realized reductant injected to an amount of reductant commanded. The ammonia performance index can be a ratio of the units of operational reductant injected over the units of reductant commanded. The ammonia performance index may be a function of the operational reductant injected versus the reductant commanded. The ammonia performance index can also be a qualitative description of the operational reductant injected in comparison to the reductant commanded (e.g. always low, always high). The operation 322 can adjust the doser operational reductant injection, in response to the ammonia performance index as an offset (e.g. commanded 100 units of reductant, realizing 90 units, therefore will increase by 10 units or a portion thereof). The operation 322 can adjust the doser operational reductant injection as a ratio, e.g. the reductant injection is 10% low so therefore it should be increased by the entire 10% or a portion thereof. The operation 322 can also adjust the doser operational reductant injection as a function which may store the function and calculate as necessary and interpolate or extrapolate values. The doser operational reductant injection may also be adjusted using incremental or decremental values (e.g. the ANR is low, therefore increase reductant injection by 2 units . . . if a subsequent operation of the test indicates that it is still low increase by 2 more units, etc.). The described behaviors utilizing the NH$_3$ performance index and operations 322 described are illustrative and non-limiting.

Another exemplary procedure for diagnosing the performance of a reductant doser and compensating for an off-nominal doser is described following. The procedure includes an operation to determine whether selective catalytic reduction (SCR) test conditions are present. The determination of whether test conditions are present includes the determination of any set of conditions wherein a reductant dosing change is observable as a change in the downstream NOx concentration of the SCR catalyst element without a lag period, or with only a small, compensatable lag period. Exemplary SCR test conditions include determining an SCR catalyst has a filled storage capacity or a low maximum storage capacity. Another non-limiting example of determining whether test conditions are present includes the determination that a NOx amount increase due to the operations of the SCR test is lower than a predetermined emissions threshold.

An exemplary determination of the SCR test conditions includes determining whether a current space velocity of the SCR catalyst is less than a space velocity threshold. Another exemplary determination of the SCR test conditions includes determining whether a current exhaust flow rate is less than an exhaust flow rate threshold. Another exemplary determination of the SCR test conditions includes determining whether an SCR catalyst temperature is below an SCR catalyst maximum temperature threshold. Another exemplary determination of the SCR conditions includes determining whether an SCR catalyst temperature is above an SCR catalyst minimum temperature threshold. Yet another exemplary determination of the SCR test conditions includes determining whether a current SCR test NO$_x$ impact is less than an SCR test NO$_x$ impact threshold.

In response to the SCR test conditions being present, the exemplary procedure includes an operation of the SCR aftertreatment system at a number of reduced ammonia to NO$_x$ ratio (ANR) operating points. The reduced ANR operating points may be any ANR operating points below a normal operating point of the SCR system, and/or any ANR operating points below a stoichiometric ANR wherein a NO$_x$ output of the SCR system is observable on a downstream NO$_x$ system. In an exemplary, non-limiting embodiment, the number of reduced ANR includes a first test ANR value that is lower than 0.3 and a second test ANR value that is greater than 0.6.

The exemplary procedure further includes an operation to determine a deNO$_x$ efficiency value corresponding to each of the number of ANR operating points. The deNO$_x$ efficiency value may be determined in response to the amount of NO$_x$ entering the SCR catalyst (either measured or modeled), and the amount of NO$_x$ exiting the SCR catalyst (measured by the NO$_x$ sensor).

The exemplary procedure further includes, in response to the deNO$_x$ efficiency values corresponding to each of the number of ANR operating points, determining a reductant correction value. In certain embodiments, determining the reductant correction value includes determining a test slope in response to the first test ANR value and the second test ANR value. In certain embodiments, the procedure includes determining one or more slopes, and or several data points to relate the realized flow output of the reductant doser to the commanded flow output of the reductant doser over a range of flow values.

In certain embodiments, the operation to determine the reductant correction value includes an operation to interpret an NH$_3$ performance index. In further embodiments, the operation to interpret the NH$_3$ performance index includes determining an ammonia delivered amount for an injector as a function of an ammonia commanded amount. Another exemplary embodiment includes, in response to the ammonia delivered amount for an injector as a function of the ammonia commanded amount, changing one of an ANR target value and an injector command function. The injector command function includes a schedule of injector commands corresponding to injector flow rates.

In certain embodiments, the operation to determine the reductant correction value further includes determining a test intercept in response to the first test ANR value and the second test ANR value. In a further embodiment, the procedure includes an operation to determine the test is valid in response to the test intercept being a deNO$_x$ efficiency value close to zero.

The exemplary procedure further includes an operation to provide a reductant injection command in response to the reductant correction value.

Referencing FIG. 5, a graphical representation of exemplary data illustrating certain engine operating conditions vs. time. It can be seen from the exemplary data in FIG. 5 that, at certain operating conditions where the engine approaches steady state operation, the NOx output of the engine levels out to a pseudo-steady value. The marked regions 501, 502, 503, 504 illustrate several locations where engine out NOx is high enough to be reliably measured and approaches steady operation. One of skill in the art can readily determine information as shown in FIG. 5 for a particular system, and the data as shown in FIG. 5 can be utilized to set appropriate SCR test conditions 210 where an SCR test has a higher likelihood of success.

As is evident from the figures and text presented above, a variety of embodiments according to the present invention are contemplated. In one embodiment of the present application, it is determined whether a set of SCR test conditions are present in the SCR catalyst to properly diagnose SCR catalyst performance. These conditions may include creating a set of conditions at which the exhaust $NO_x$ signal is sufficiently high to be accurately read by a commercial $NO_x$ sensor, determining that ammonia slip is essentially zero, and determining SCR performance is predictable and minimally affected by fluctuations of environmental factors including catalyst temperature, engine speed, net brake torque, and exhaust flow rate. Following a determination that the SCR test conditions are met, at least two ammonia/$NO_x$ ratio (ANR) test points are created by lowering the ANR to two points below an ANR of 1. At each test point, the corresponding $deNO_x$ efficiency is determined. Through a comparison of the ANR test points and respective $deNO_x$ efficiencies, the performance of a doser can be determined; therefore, the doser map and amount of reductant injected by the doser may be adjusted accordingly.

In yet another embodiment of the present invention, key input values including current values of catalyst temperature and mass flow rate as well as factors related to SCR catalyst short-term history including average temperature and maximum catalyst efficiency may be determined. The catalyst temperature should be below a certain level to ensure that conditions do not favor parasitic oxidation of ammonia by oxygen. It should be determined that catalytic conditions are not conducive to ammonia storage on the catalyst and that space velocity is sufficient to prevent interaction between slipped ammonia and measured $NO_x$.

Dosing should then be modified to meet a diagnostic ANR which can be a value ranging from 0.3 to 0.7, 0.2 to 0.7, 0.2 to 0.9, or another selected range. Data may then be sampled from an inlet $NO_x$ sensor and an outlet $NO_x$ sensor for approximately 5-10 seconds. The average inlet $NO_x$ and average outlet $NO_x$ should then be calculated for the 5-10 second sampling window. It may then be determined that no sharp transients occurred during the 5-10 second sampling window. This aforementioned process is to be repeated until measurements at all desired ANRs have been taken.

The ANR may then be increased back to its original value. The $deNO_x$ efficiency is determined for each of the desired ANR points. The slope of the $deNO_x$ efficiency vs. respective ANR is then calculated. The linearity and intercept of the $deNO_x$ efficiency vs. respective ANR attests to the reliability of the test. The slope provides diagnostic information about the doser performance.

The aforementioned data, including $deNO_x$ efficiency at various ANRs, may be collected over time and interpreted in the form of a doser characteristic. If the slope of the doser characteristic is less than 100, the realized ANR is lower than expected and a final dosing command may be increased by an adjustment factor. If the slope of the doser characteristic is greater than 100, the realized ANR is higher than expected and a final dosing command may be decreased by an adjustment factor. The aforementioned process is repeated at selected intervals to re-assess the need for command adjustment.

An exemplary set of embodiments is a method including providing an internal combustion engine fluidly coupled to a selective catalytic reduction (SCR) catalyst treating an exhaust stream from the internal combustion engine, determining if SCR test conditions are met, interpreting a first test ammonia to $NO_x$ ratio (ANR), injecting a first amount of reductant in response to the first test ANR, and determining a first $deNO_x$ efficiency in response to the injecting. The method further includes interpreting a second test ANR, injecting a second amount of reductant in response to the second test ANR, and determining a second $deNO_x$ efficiency in response to the injecting, and adjusting an operational reductant injection to achieve a target ANR. The exemplary method further includes determining at least one of a slope and an intercept in response to the first $deNO_x$ efficiency and the second $deNO_x$ efficiency, and adjusting the operational reductant injection in response to the at least one of the slope and the intercept. An exemplary method further includes interpreting an ammonia performance index in response to the first $deNO_x$ efficiency and the second $deNO_x$ efficiency, and adjusting the operational reductant injection in response to the ammonia performance index. Another exemplary method includes determining if SCR test conditions are met by determining if a current space velocity is less than a space velocity threshold, determining if a current exhaust flow rate is less than an exhaust flow rate threshold, determining if an SCR catalyst temperature is below an SCR catalyst maximum temperature threshold, determining if the SCR catalyst temperature is above an SCR minimum temperature threshold, and/or determining if a current SCR test NO impact is less than an SCR test $NO_x$ impact threshold.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining whether selective catalytic reduction (SCR) test conditions are present;
   in response to the SCR test conditions being present, operating an SCR aftertreatment system at by injecting a reductant at a plurality of reductant amounts to achieve a plurality of ammonia to NOx ratio (ANR) operating points having an ANR less than 1;
   determining a $deNO_x$ efficiency value corresponding to each of the plurality of ANR operating points;
   in response to the $deNO_x$ efficiency values corresponding to each of the plurality of ANR operating points, determining a reductant correction value in response to a difference between a realized $deNO_x$ efficiency change over the plurality of ANR operating points and an expected $deNO_x$ efficiency change; and
   providing a reductant injection command in response to the reductant correction value;
   wherein the operating the SCR aftertreatment system at a plurality of reduced ammonia to NOx ratio (ANR) operating points comprises operating the SCR aftertreatment system at a first test ANR value that is lower than 0.3 and at a second test ANR value that is greater than 0.6, and the determining the reductant correction value comprises determining a test slope in response to the first test ANR value and the second test ANR value.

2. The method of claim 1, wherein the determining whether SCR conditions are present comprises determining whether a current space velocity is less than a space velocity threshold.

3. The method of claim 1, wherein the determining whether SCR conditions are present comprises determining whether a current exhaust flow rate is less than an exhaust flow rate threshold.

4. The method of claim 1, wherein the determining whether SCR conditions are present comprises determining whether an SCR catalyst temperature is below an SCR catalyst maximum temperature threshold.

5. The method of claim 1, wherein the determining whether SCR conditions are present comprises determining whether an SCR catalyst temperature is above an SCR catalyst minimum temperature threshold.

6. The method of claim 1, wherein the determining whether SCR conditions are present comprises determining whether a current SCR test $NO_x$ impact is less than an SCR test $NO_x$ impact threshold.

7. The method of claim 1, wherein the determining the reductant correction value comprises interpreting an $NH_3$ performance index.

8. The method of claim 7, wherein the interpreting the $NH_3$ performance index comprises determining an ammonia delivered amount for an injector as a function of an ammonia commanded amount.

9. The method of claim 8, further comprising, in response to the ammonia delivered amount for an injector as a function of the ammonia commanded amount, changing one of an ANR target value and an injector command function; wherein the injector command function comprises a schedule of injector commands corresponding to injector flow rates.

10. The method of claim 1, wherein the determining the reductant correction value further comprises determining a test intercept in response to the first test ANR value and the second test ANR value.

11. The method of claim 10, further comprising determining the test is valid in response to the test intercept being a $deNO_x$ efficiency value close to zero.

12. An apparatus, comprising:
an SCR test condition validation module structured to determine whether SCR test conditions are present;
an injection control module structured to command a first reductant amount for a first test ANR and a second reductant amount for a second test ANR that are each less than 1 in response to the SCR test conditions being present;
an injector diagnostic module structured to determine a first $deNO_x$ efficiency value in response to the first test ANR, and a second $deNO_x$ efficiency value in response to the second test ANR; and
an injector correction module structured to determine a reductant correction value in response to a difference between a realized $deNO_x$ efficiency change between the first test ANR and the second test ANR and an expected $deNO_x$ efficiency change, and to adjust an operational reductant injection amount in response to the reductant correction value;
wherein the injector diagnostic module is further structured to determine a test slope and a test intercept in response to the first $deNO_x$ efficiency value and the second $deNO_x$ efficiency value, and wherein the injector correction module is further structured to determine the reductant correction value in response to the test slope and the test intercept.

13. The apparatus of claim 12, wherein the SCR test condition validation module is further structured to determine whether SCR test conditions are present in response to at least one parameter selected from the parameters consisting of a space velocity threshold, an exhaust flow rate threshold, an SCR minimum temperature threshold, an SCR maximum temperature threshold, and an SCR test $NO_x$ impact threshold.

14. The apparatus of claim 12, wherein the injector diagnostic module is further structured to determine an $NH_3$ performance index in response to the first $deNO_x$ efficiency value and the second $deNO_x$ efficiency value, and wherein the injector correction module is further structured to determine the reductant correction value in response to the $NH_3$ performance index.

15. The apparatus of claim 12, wherein the injector diagnostic module is further structured to determine whether the reductant correction value is valid in response to the test intercept.

16. The apparatus of claim 14, wherein the injector diagnostic module is further structured to determine an $NH_3$ performance index by determining an ammonia delivered amount for an injector as a function of an ammonia commanded amount.

17. The apparatus of claim 16, wherein the injector correction module is further structured to change one of an ANR target value and an injector function command in response to the ammonia delivered amount for the injector as a function of the ammonia commanded amount; wherein the injector command function comprises a schedule of injector commands corresponding to injector flow rates.

18. A system, comprising:
an internal combustion engine producing an exhaust stream;
a selective catalytic reduction (SCR) catalyst structured to reduce an amount of NOx in the exhaust stream in the presence of a reductant;
a reductant injector operationally coupled to the exhaust stream at a position upstream of the SCR catalyst;
a NOx sensor operationally coupled to the exhaust stream at a position downstream of the SCR catalyst;
a means for determining an amount of engine-out NOx; and
a controller configured to command the reductant injector to inject a first reductant amount for a first test ANR and a second reductant amount for a second test ANR, with each test ANR having an ANR less than 1, in response to SCR test conditions being present, wherein the controller is further configured to determine a first $deNO_x$ efficiency value in response to the first test ANR and a second $deNO_x$ efficiency value in response to the second test ANR and a reductant correction value in response to a difference between a realized $deNO_x$ efficiency change from the first test ANR to the second test ANR and an expected $deNO_x$ efficiency change, and to adjust an operational reductant injection amount in response to the reductant correction value;
wherein the controller is configured to determine a test slope and a test intercept in response to the first $deNO_x$ efficiency value and the second $deNO_x$ efficiency value, and to determine the reductant correction value in response to the test slope and the test intercept.

19. The system of claim 18, wherein the controller is configured to determine whether SCR test conditions are present in response to at least one parameter selected from the parameters consisting of a space velocity threshold, an exhaust flow rate threshold, an SCR minimum temperature threshold, an SCR maximum temperature threshold, and an SCR test $NO_x$ impact threshold.

20. The system of claim 18, wherein the controller is configured to determine whether the reductant correction value is valid in response to the test intercept.

21. The system of claim 18, wherein the reductant injector comprises a urea injector, and wherein the controller is configured to determine an $NH_3$ performance index by determining an ammonia delivered amount for an injector as a function of an ammonia commanded amount.

22. The system of claim 18, wherein the controller is configured to change one of an ANR target value and an injector function command in response to the ammonia delivered amount for the injector as a function of the ammonia commanded amount; wherein the injector command function comprises a schedule of injector commands corresponding to injector flow rates, and wherein the reductant injector is responsive to the injector commands.

23. The system of claim 18, wherein the means for determining an amount of engine-out $NO_x$ comprises one of an engine-out $NO_x$ model and a $NO_x$ sensor operationally coupled to the exhaust stream at a position upstream of the reductant injector.

* * * * *